(12) United States Patent
Smith

(10) Patent No.: US 6,301,973 B1
(45) Date of Patent: Oct. 16, 2001

(54) NON-INTRUSIVE PRESSURE/ MULTIPURPOSE SENSOR AND METHOD

(75) Inventor: William C. Smith, Las Cruces, NM (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/302,976

(22) Filed: Apr. 30, 1999

(51) Int. Cl.[7] .................................. G01F 1/84; G01F 1/66

(52) U.S. Cl. .................................. 73/861.357; 73/861.27; 73/861.356

(58) Field of Search ....................... 73/861.355, 861.356, 73/861.357, 861.27

(56) References Cited

U.S. PATENT DOCUMENTS

| | | | |
|---|---|---|---|
| 3,021,711 | 2/1962 | Arvidson | 73/398 |
| 3,257,850 | 6/1966 | Kooiman | 73/398 |
| 3,802,252 | 4/1974 | Haywood et al. | 73/52 |
| 3,859,844 | 1/1975 | Hruby | 73/45.4 |
| 4,009,616 | 3/1977 | Wonn | 73/398 R |
| 4,098,133 | 7/1978 | Frische et al. | 73/702 |
| 4,126,049 | 11/1978 | Cotter | 73/702 |
| 4,187,718 | 2/1980 | Shibasaki | 73/52 |
| 4,385,636 | 5/1983 | Cosman | 128/748 |
| 4,563,902 | 1/1986 | Kohnlechner | 73/708 |
| 4,574,639 | 3/1986 | Ward | 73/702 |
| 4,600,855 | 7/1986 | Strachan | 310/338 |
| 4,604,898 | 8/1986 | Gohin et al. | 73/701 |
| 4,644,796 | 2/1987 | Ward | 73/702 |
| 4,691,573 | 9/1987 | Varnum et al. | 73/702 |
| 4,838,084 | 6/1989 | Leopold et al. | 73/32 A |
| 4,869,097 | 9/1989 | Tittmann et al. | 73/52 |
| 4,872,335 | 10/1989 | Tsuruoka et al. | 73/30 |
| 4,991,153 | 2/1991 | Tsuruoka et al. | 367/172 |
| 5,235,844 | 8/1993 | Bonne et al. | 73/24.01 |
| 5,249,467 | 10/1993 | Takashima | 73/702 |
| 5,259,250 | * 11/1993 | Kolpak | 73/861.356 |
| 5,351,527 | 10/1994 | Blackburn et al. | 73/52 |
| 5,353,631 | 10/1994 | Woringer et al. | 73/52 |

(List continued on next page.)

FOREIGN PATENT DOCUMENTS

0088362-A1 * 9/1983 (EP) .

OTHER PUBLICATIONS

"Behaviour of straight pipe Coriolis mass flowmeters in the metering of gas: theoretical predictions with experimental verification", N. M. KeitaFlow Meas. Instrum., 1994, vol. 5, #4, pp. 289–291, 293 & 294.

"Adaption of Commercial Coriolis Flow Meters for Non–Intrusive Pressure Measurements," William C. Smith & Robert R. Rowalski, Proceedings of the 44th International Instrumentation Symposium, sponsored by Aerospace Industries Division & Test Measurements division, Instrument Society of America (May 1998) pp. 87–96.

*Primary Examiner*—Harshad Patel
(74) *Attorney, Agent, or Firm*—Hardie R. Barr

(57) ABSTRACT

Method and apparatus are provided for determining pressure using a non-intrusive sensor that is easily attachable to the plumbing of a pressurized system. A bent mode implementation and a hoop mode implementation of the invention are disclosed. Each of these implementations is able to non-intrusively measure pressure while fluid is flowing. As well, each implementation may be used to measure mass flow rate simultaneously with pressure. An ultra low noise control system is provided for making pressure measurements during gas flow. The control system includes two tunable digital bandpass filters with center frequencies that are responsive to a clock frequency. The clock frequency is divided by a factor of N to produce a driving vibrational signal for resonating a metal sensor section.

43 Claims, 5 Drawing Sheets

U.S. PATENT DOCUMENTS

| | | | |
|---|---|---|---|
| 5,373,745 | 12/1994 | Cage | 73/861.37 |
| 5,386,714 | 2/1995 | Dames | 73/24.05 |
| 5,398,554 * | 3/1995 | Ogawa et al. | 73/861.357 |
| 5,423,225 | 6/1995 | Cage | 73/861.37 |
| 5,448,921 | 9/1995 | Cage et al. | 73/861.38 |
| 5,528,939 | 6/1996 | Martin et al. | 73/702 |
| 5,585,567 | 12/1996 | Van Manen | 73/702 |
| 5,602,344 * | 2/1997 | Lew et al. | 73/861.356 |
| 5,656,779 | 8/1997 | Bronowicki | 73/668 |
| 5,675,074 | 10/1997 | Melvin, II | 73/52 |
| 5,837,885 | 11/1998 | Goodbread et al. | 73/32 A |

* cited by examiner

| TECHNIQUE | VIB MODE | SENSITIVITY HZ/PSI (GN2) | RES FREQ KHZ |
|---|---|---|---|
| TEST | BENDING | -0.00252 | 0.156 |
| TEST | HOOP | 0.90 | 4.7 |
| FEA MODEL | MEMBRANE | 0.066 | 49.6 |
| FEA MODEL | HOOP (n=2) | 1.06 | 4.2 |
| FEA MODEL | HOOP (n=3) | 1.30 | 11.2 |
| FEA MODEL | HOOP (n=4) | 1.38 | 21.5 |
| FEA MODEL | HOOP (n=5) | 1.40 | 35.1 |

NON-INTRUSIVE PRESSURE/ MULTIPURPOSE SENSOR AND METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to apparatus and methods for non-intrusive measurements of internal pressure and/or other measurements and, more specifically, to hoop-mode and bending-mode resonance vibration of a tubular section for determining internal pressure and/or other measurements such as those produced by Coriolis mass flow meters.

2. Description of Prior Art

Traditional measurements of gas pressure in a plumbing system typically require penetration through a vessel wall to provide a coupling or pressure port from the enclosed gas to the transducer's sensing surface. The pressure port is connected to a fluid-coupled sensor such as a pressure responsive diaphragm. In some systems, it is desirable to provide a non-intrusive pressure sensor whereby it is meant that no sensor surface other than a section of containment conduit such as steel pipe is in contact with the fluid so that it is not necessary to penetrate an existing wall to contact a diaphragm. Moreover, a non-intrusive sensor as disclosed herein preferably permits fluid to flow therethrough in an unrestricted manner through a section of pipe and can be retrofitted to the plumbing of a system by addition of the section of pipe. As far as could be determined, non-intrusive pressure sensors are not available from commercial vendors.

While a non-intrusive pressure measurement system may be useful for various applications, a particular application of interest is that of monitoring the health of propulsion system components such as the Helium Pressurization Components of the Space Shuttle's Orbital Maneuvering System and Reaction Control System. Thus, there is also a desire to measure pressures of specific gases and therefore for determining whether different gases may cause a difference in the response of a vibrational pressure measuring device irrespective of gas pressure.

Coriolis flow measurement devices are commercially available for measuring liquid flow and, more recently, gas flow. The physical operating principle in such meters is based on a Coriolis acceleration. In some cases, these devices are also used to measure gas density and temperature. The presently available Coriolis flow measurement devices fall into two general categories according to the vibrational mode used in the sensing pipes, i.e., hoop-mode and bending-mode implementations. There are many bending-mode implementation variations with respect to the shape of the bend and the location of the sensors some of which variations are discussed in some of the following listed patents. The operation of Coriolis type flow measurement is based on a Coriolis acceleration of the fluid mass within a pipe section and results in a measurable deflection. The deflection is directly proportional to mass flow through the tube. While rotational motion may be used to implement a Coriolis type flow meter, vibration may also be used to produce the same Coriolis force. The bending mode implementation for a Coriolis flow meter utilizes a vibration mode for which a curved segment of pipe is cantilevered about the axis of an adjacent straight section. Sensors on each of the two legs of the vibrated U-hoop or bent pipe sense the difference in phase of the two legs resulting from the twist caused by the constrained fluid segment. This relative phase difference is the physical operating principle of the bending-mode Coriolis mass flow meter. The hoop-mode implementation for a Coriolis flow meter utilizes a vibration mode for which a narrow cross-section of a straight section of pipe is vibrationally squeezed such as by a driving element that may be a piezoelectric element or other driver element. The pinching vibration causes a slight deflection velocity that is detected by another sensor which for certain modes of vibration may be located at the diametrically opposite side from the driver element. Physical parameters sensed in the commercial Coriolis-type meters include the phase shift between axially displaced sensors, the frequency or period of the vibrated pipe segment, and the pipe temperature. Numerous implementations have demonstrated that the mass flow rate for these meters is proportional to the phase shift between appropriately located sensors on the vibrated pipe carrying the process fluid. The frequency of the vibrating pipe segment, usually driven at resonance or slightly off resonance, is typically measured to calculate the density of the gas and to compensate the density dependence of the flow measurement. The temperature of the pipe is typically measured to provide temperature compensation for the elastic coefficient of the tube, but that temperature is also often taken to be a satisfactory approximation for the temperature of the fluid. This latter approximation is typically close for most fluids but becomes increasingly poorer with decreasing fluid density.

N. M. Keita discloses a theoretical and measured pressure effect on meter characteristics of frequency and mass flow sensitivity for constant fluid density in "Behavior of Straight Pipe Coriolis Mass Flowmeters in the Metering of Gas: Theoretical Predictions with Experimental Verification" from *Flow Measurement and Instrumentation*, Vol. 5, No. 4 (1994): pp. 289–294. However, Keita states that the pressure effect (on mass flow sensitivity error) is due to stress stiffening of the mechanical oscillator, is strongly dependent on design, and is not easy to compute. Possibly for this reason Keita's goal is to provide corrections for mass flow rate measurement rather than determine pressure directly.

U.S. Pat. No. 4,600,855, issued Jul. 15, 1986, to J. S. Strachan, discloses an apparatus for measuring pressure within a conduit whose resonant frequency varies with the pressure of the fluid within the tube. As shown, the device requires insertion into the pressure media to be measured, i.e., blood artery pressure, and is therefore an intrusive type of pressure sensor rather than a non-intrusive sensor. The device is not intended to be used with gas or with flowing fluid. The axial length of the sensors limits sensitivity of the device and, due to multiple modes of vibration, would probably not be operable when used when fluid flows therethrough. The disclosed range of measurable pressures is not adequate for certain operations. Excitation means are not disclosed. Other types of measurements are not disclosed. Bending mode and, effectively, hoop-mode operation are not disclosed.

U.S. Pat. No. 5,585,567, issued Dec. 17, 1996, to P. Van Manen discloses an apparatus for exciting at least the fundamental radial circumferential mode of vibration and the first harmonic thereof in a gas bottle. Both frequencies are used for determining the pressure of the bottle. The device is apparently not intended to be particularly accurate as the inventor states that the need is to quickly determine whether a gas bottle is pressurized or not where the bottles are often stacked closely together.

U.S. Pat. No. 3,021,711, issued Feb. 20, 1962, to G. Arvidson, discloses an intrusive-type pressure sensor, with the pressure coupled to a sensing device within a housing rather than a pipe section through which fluid can freely flow. The invention is characterized by the provision of a hollow body capable of being set in vibration by feeding energy thereto. The respective pressure or difference pressure is supplied to the device through one or two openings within a housing to allow a pressure or difference pressure between two fluids to be measured.

U.S. Pat. No. 3,257,850, issued Jun. 28, 1966, to R. R. Kooiman, discloses an intrusive type of sensor which in the tubular form thereof uses a flexible diaphragm for detecting pressure vibration.

U.S. Pat. No. 4,098,133, issued Jul. 4, 1978, to Frische et al., discloses an intrusive fluid pressure type having a thin flat vibrating diaphragm serving as a wall of a continuous pressure chamber for converting a variable fluid pressure magnitude directly into a variable frequency electrical signal.

U.S. Pat. No. 5,528,939, issued Jun. 25, 1996, to Martin et al., discloses an improved gas pressure gauge that extends the linear range of pressure dependent damping to higher pressures by placing a stationary member in very close proximity to the vibrating member.

U.S. Pat. No. 5,249,467, issued Oct. 5, 1993, to M. Takashima, discloses a vascular pressure detecting apparatus with a pressure sensor having a vibrating element forming a pressure sensing surface which is secured to a housing at the periphery end thereof.

U.S. Pat. No. 4,991,153, issued Feb. 5, 1991, to Tsuruoka et al., discloses a device that detects the resonant frequency of a vibratory member in contact with a fluid.

U.S. Pat. No. 4,691,573, issued Sep. 8, 1987, to Varnum et al., discloses a fluid filled force or pressure sensor for measuring an external force such as fluid pressure using a flexible diaphragm in contact with the fluid of interest.

U.S. Pat. No. 4,872,335, issued Oct. 10, 1989, to Tsuruoka et. al, discloses a vibrating transducer for detecting the resonant frequency of a vibrating diaphragm and using that frequency to determine the pressure or density of a fluid contacting the diaphragm.

U.S. Pat. No. 4,644,796, issued Feb. 24, 1987, to Roger W. Ward, discloses a fluid density measuring apparatus and method for directly measuring fluid density or indirectly measuring pressure using a bellows.

U.S. Pat. No. 4,385,636, issued May 31, 1983, to E. R. Cosman, discloses an improvement in design of an implantable telemetric differential pressure sensing device.

U.S. Pat. No. 4,574,639, issued Mar. 11, 1986, to R. W. Ward, discloses a fluid density measuring apparatus and method for directly measuring fluid density or indirectly measuring pressure, temperature, acceleration, flow velocity, differential pressure and other parameters affecting the apparatus by using a bellows apparatus and other sensor elements.

U.S. Pat. No. 4,563,902, issued Jan. 14, 1986, to R. Kohnlechner, discloses a pressure measuring device wherein a housing includes a pressure sensor in a pressure chamber and an electronic circuit in a non-pressurized chamber.

U.S. Pat. No. 4,126,049, issued Nov. 21, 1978, to M. A. Cotter, discloses a system and method for measuring fluid pressure based on resonant frequency of a nearly perfect single crystal material.

U.S. Pat. No. 5,373,745, issued Dec. 20, 1994, to D. R. Cage, discloses a flow meter apparatus for measuring the mass flow rate of a fluid using the Coriolis principle. In one aspect, it is apparently taught that pressure may be derived from equations containing two frequency modes rather than a single resonant frequency.

U.S. Pat. No. 5,423,225, issued Jun. 13, 1995, to D. R. Cage, discloses a flow meter apparatus for measuring the mass flow rate of a fluid using the Coriolis principle.

U.S. Pat. No. 5,448,921, issued Sep. 12, 1995, to Cage et al., discloses teachings similar to those in the above cited references for which he is listed as an inventor.

U.S. Pat. No. 5,837,885, issued Nov. 17, 1998, to Goodbread et al., discloses a resonator vibrating close to its resonance frequency excited by a first transducer and connected to an oscillator. The vibration is measured by the transducer or a second transducer and stabilized by a phase-lock feedback loop. No teaching is made of how to determine pressure. As well, the control system apparently is not designed to maintain a system at resonance frequency. Moreover it is not disclosed how to do so with minimum phase shift error as may be desirable for measuring pressure especially with mass flow.

U.S. Pat. No. 5,656,779, issued Aug. 12, 1997, to A. J. Bronowicki, discloses a self-exciting vibratory device for producing vibration signals in a housing and includes an actuator means, sensor means, and electronics module.

U.S. Pat. No. 5,235,844, issued Aug. 17, 1993, to Bonne et al., discloses a transducer apparatus using tuning forks for simultaneously determining pressure and one other property of a flowing gas of varying pressure and composition.

U.S. Pat. No. 5,675,074, issued Oct. 7, 1997, to R. G. Melvin, II., discloses a method of analyzing internal pressure of a closed container including vibration of a surface, detecting sound resulting from the detected sound, and determining whether the information corresponds to predetermined spectral frequency condition. No effort to vibrate a tube at resonance is disclosed.

U.S. Pat. No. 5,353,631, issued Oct. 11, 1994, to Woringer et al., discloses that the internal pressure of a sealed container is characterized by tapping to vibrate a wall of the container and then basing the characterization of the internal pressure on a frequency spectrum of the vibration and stored data measured from vibrating other containers.

U.S. Pat. No. 5,351,527, issued Oct. 4, 1994, to Blackburn et al., discloses an apparatus for sensing pressure in a stiff wall sealed vessel that comprises high pressure gas for inflating a car air bag that establishes oscillations of the pressurized fluid in the vessel and detects roughly whether the pressure level is too low. The device does not teach flow measurement.

U.S. Pat. No. 4,869,097, issued Sep. 26, 1989, to Tittmann et al., discloses an apparatus for measuring the pressure of a gas within a sealed vessel. A sonic transducer is used to apply an oscillating force to the surface of the vessel. The frequency of the ultrasonic wave is swept through a range which causes resonant vibration of the gas.

U.S. Pat. No. 4,838,084, issued Jun. 13, 1989, to Leopold et al., discloses a density measurement that measures the density of a fluid by determining the frequency of oscillation of a vibrating tube filled with the fluid.

U.S. Pat. No. 5,386,714, issued Feb. 7, 1995, to A. N. Dames, discloses a density sensor that comprises a cavity arranged to receive the gas whose density is to be sensed. The cavity is divided into two chambers by a flexibly mounted diaphragm.

U.S. Pat. No. 4,604,898, issued Aug. 12, 1986, to Gohin et al., discloses a circuit using the properties of a resonating cavity sensor whose resonance frequency is modified by the electric capacity variations due to the mechanical deformation of a wall under the effect of the pressure to be measured.

U.S. Pat. No. 4,187,718, issued Feb. 12, 1980, to K. Shibasaki, discloses an apparatus for inspecting the internal pressure of a hermetically sealed container wherein a sound wave of free damped oscillation excited at the elastic wall of a hermetically sealed container is converted and detected as an electrical signal.

U.S. Pat. No. 4,009,616, issued Mar. 1, 1977, to J. W. Wonn, discloses a nondestructive acoustic method for measuring gas pressure in a hermetically sealed enclosure. The acoustic impedance mismatch between the enclosure and the gas medium is dependent upon the pressure of the gas and correspondingly affects the transmissivity of the acoustic signal.

U.S. Pat. No. 3,802,252, issued Apr. 9, 1974, to G. G. Hayward, discloses an apparatus for monitoring the pressure in a sealed container. The frequency spectrum of the signal output of the pickup device is examined. The signal output is gated.

The above discussed patents do not disclose a non-intrusive pressure sensor that requires only connecting a steel pipe section to the system plumbing and through which flow may occur. It is desirable that no sensor surface other than the steel pipe section be in contact with the fluid. Moreover, it is desirable to be able to measure pressure as fluid flow occurs and, preferably, to measure the fluid flow rate and fluid density simultaneously with pressure. A review of the above references reveals that a long felt need exists for apparatus and methods for providing non-intrusive pressure measurements. It would be desirable to have a sensor that is readily attachable or easily built into the system without adding obstructions, diaphragm ports, and the like. Those skilled in the art have long sought and will appreciate the present invention that addresses these and other problems.

SUMMARY OF THE INVENTION

The present invention provides methods and apparatus for measuring pressure and other variables such as mass flow rate and density. The system is easily and non-intrusively connectable to a pressurized system. Thus, the present invention describes a non-intrusive apparatus that may be connected to a pressurized system for monitoring pressure and, if desired, other variables. For this purpose, a metal pipe section is provided that is adaptable for connection to the system. A vibrating element is secured to the metal pipe section for vibrating the metal pipe section. At least one sensor element is secured to the pipe section for detecting a receiver signal related to a vibration frequency of the pipe. A voltage-controlled oscillator is provided for producing a reference signal and for driving the vibrating element with a driver signal and a frequency controller is operable for comparing the receiver signal and the reference signal to produce an error signal. The error signal is used for voltage control of the voltage-controlled oscillator to maintain the metal pipe section at a resonant frequency.

In one embodiment of the invention, the reference signal and the driver signal are the same signal but this need not be. The driver signal may be derived from the reference signal and in one presently preferred embodiment is an integral submultiple frequency of the reference signal.

To reduce noise in the receiver signal, a first narrow bandpass filter is provided in one embodiment for removing noise from the receiver signal. The bandpass filter preferably comprises a tunable bandpass filter that is automatically tunable responsively with respect to the reference signal. A second bandpass filter is also tunable responsively with respect to the reference signal for filtering the driver signal. A frequency counter may be used to measure the resonant frequency. In one embodiment, a digital frequency divider is used for producing a driver signal that is a submultiple of the reference signal. In one embodiment of the invention, the metal pipe section is straight without bends. An additional vibrational sensor for the pipe may be used in determining a mass flow rate through the metal pipe section.

A method is also provided for measuring a fluid pressure of a fluid within the pressurized system. For this purpose a tubular pipe may be attached or otherwise built into the pressurized system. The pipe is provided with an inlet and an outlet and with a smooth interior surface such that any fluid flow through the tubular pipe between the inlet and outlet is unrestricted. A vibrating force is applied to at least one portion of the tubular pipe for vibration at a resonant frequency. The resonant frequency of the tubular pipe is detected and used to determine the fluid pressure of the fluid within the pressurized system. In one embodiment, the pipe includes a bend between the inlet and the outlet. In another embodiment, the pipe is straight between the inlet and the outlet. A control system applies a vibrating force to at least one portion of tubular pipe at the resonant frequency and automatically tracks the resonant frequency as it varies due to changing pressure therein. In one preferred embodiment, the control system has a phaselock loop system for the automatic tracking of the resonant frequency. In another embodiment, the control system has a very low phase noise driver circuit for the application of the vibration force. In one embodiment, the control system is implemented with integrated circuit components.

To non-intrusively effect multiple measurements in the pressurized system, at least two vibrational sensors are externally connected to the section of pipe. The resonant frequency of the section of pipe in the pressurized system is determined from one of the two vibrational sensors. A phase difference signal is measured between the at least two vibrational sensors. The mass flow rate through the section of pipe may be determined from the phase difference. The pressure may be determined within the section of pipe from the resonant frequency. The gas density may also be determined from the resonant frequency of the section of pipe. The steps of determining and displaying mass flow rate and pressure may be performed simultaneously.

Thus, the present invention may be used for determining a pressure within the pipe from the vibrational signal while a fluid is flowing through the pipe. For this purpose, reduced noise is desirable and therefore the vibrational force is provided to have a very low sinusoidal phase error. A digital divider chain may be used for producing an integral submultiple of a signal from the voltage-controlled oscillator to produce a resonance drive signal for the vibration element.

To reduce noise from the detected signal, a narrow frequency bandwidth of the sensing signal at the resonant frequency is monitored such as with a tunable digital filter. In one embodiment of the invention, averaging the sensing signal over a plurality of cycles of the sensing signal was used to reduce noise. Using a frequency spectrum detector, the averaged sensing signal was peak detected.

In another method of the present invention, a method of identifying a fluid is provided. A non-intrusive sensor is provided to the pressurized sensor. The fluid pressure is determined from the resonant frequency of the non-intrusive sensor. The temperature is measured. The fluid density is determined. From the fluid pressure, fluid density, and temperature, a state equation is formed from which the fluid is identified.

It is an object of the present invention to provide an improved method for measuring pressure.

It is a further object of the present invention to provide a technique for conveniently and non-intrusively connecting to the plumbing of a pressurized system.

Yet another object is to measure pressure while gas flows through the pressure measurement pipe.

Yet another object is to permit multiple measurements such as pressure, mass flow, density, and other measurements that may be related to phase difference or resonant frequency.

Yet another object of the present invention is to provide an ultra low phase error in the exciting force and a very narrow bandwidth detector to limit noise.

A feature of the present invention is a pipe sensor that may be easily connected to a system.

Another feature of the present invention is a pipe sensor that may be bent or straight.

Another feature of the present invention is an ultra low noise transmitter and detector.

An advantage of the present invention is a control system that may be implemented with off the shelf integrated circuits.

Another advantage of the present invention is the ability to non-intrusively make multiple measurements from a single sensor section.

Another advantage of the present invention is the ability for easily deriving density and, as taught elsewhere, viscosity values from frequency measurement for flowing gases.

Yet another advantage of the present invention is that of providing the means for performing gas mass flow measurements co-existently with gas pressure measurements.

The above objects, features, and advantages are not intended to limit the invention or claims in any conceivable manner but are intended merely to be informative of some of the objects, features, and advantages of the present invention. In fact, these and yet other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

BRIEF DESCRIPTION OF PREFERRED EMBODIMENTS

The present invention discloses methods and apparatus for making multiple measurements from a single sensor. The device of the present invention may be readily attached for non-intrusive connection to a pressurized system or designed into a system for monitoring purposes. In accordance with a more complete disclosure of the invention, the paper of William C. Smith and Robert R. Kowalski entitled "Adaption of Commercial Coriolis Flow Meters for Non-Intrusive Pressure Measurements" from *Proceedings of the 44th International Instrumentation Symposium,* sponsored by Aerospace Industries Division and Test Measurements division, Instrument Society of America (May 1998), pp 87–96 is hereby incorporated herein by reference and made a part hereof.

Figure 1:
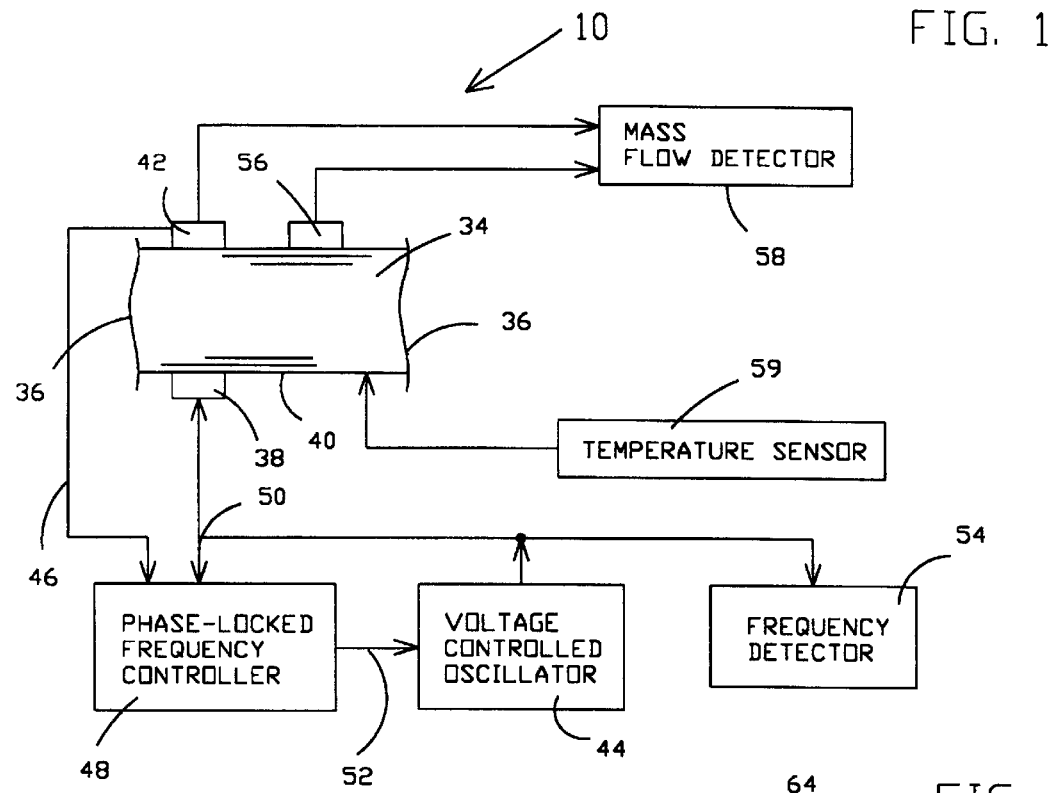
FIG. 1 is a block diagram of a system for developing hoop mode resonance in a section of pipe through which fluid may flow in accord with the present invention.
Figure 2:
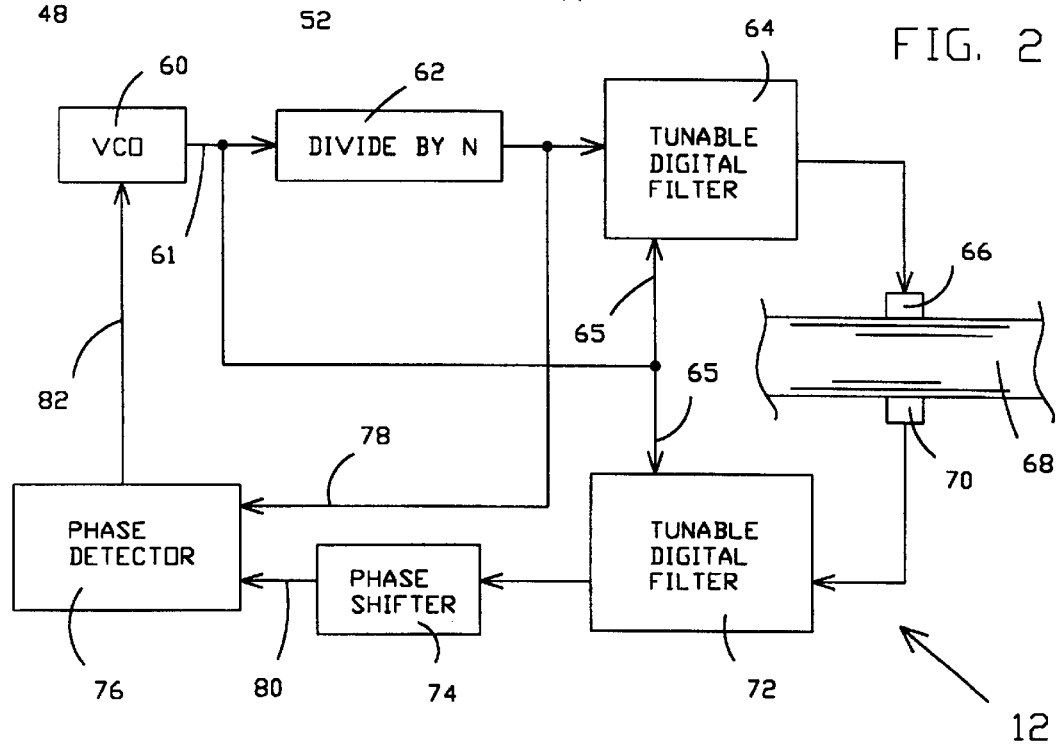
FIG. 2 is a block diagram of a control circuit having low phase noise error as an embodiment of the invention for resonating a pipe.
Figure 3:
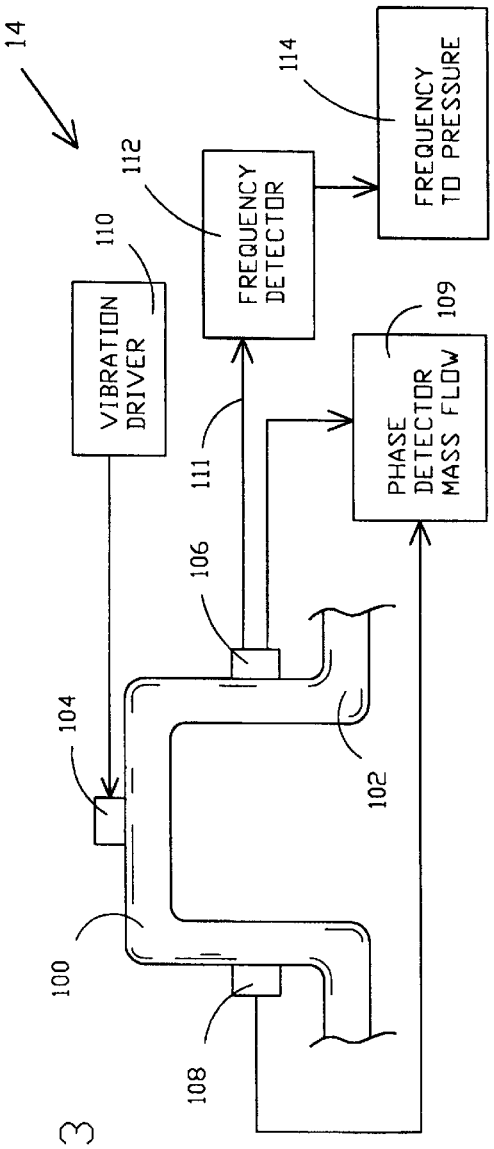
FIG. 3 is a block diagram for a bending mode sensor for pressure and mass flow measurement in accord with the present invention.

Referring now to the drawings, several of the various embodiments and features of the invention are shown in FIG. 1–FIG. 3. Hoop mode sensor 10 is described in FIG. 1, low noise controller 12 is shown in FIG. 2, and bending mode sensor 14 is described in FIG. 3.

Referring to FIG. 1, there is shown a basic implementation of hoop mode pressure sensing embodiment 10. Hoop mode device 10 includes a straight section of pipe 34 that is adaptable to or built into a pressurized system as indicated by end elements 36. End elements 36 are intended to represent suitable connectors to the desired system. In this way, pipe 34 can be easily mounted to the plumbing of a pre-existing system or designed into a system. In this particular embodiment, pipe 34 has 0.75-inch diameter and 0.020 inch wall and may comprise an ordinary steel pipe. The relatively thin wall thickness of pipe 34 provides additional sensitivity but limited the overall useful pressure rating of the system for the present device to about 5700 kPa (830 psi). A heavier wall pipe could be used with a suitable driving force.

Driver transducer 38 may be mounted in various ways. The mounting method must be suitable for the characteristics and limitations of the particular type of transducer. For instance, brazing would not be suitable for a piezoelectric driver but might well be suitable for mounting another type of driver. Epoxy mounting to outside wall 40 of pipe 34 was used in the present case. For this embodiment, a two-inch diameter round flat piezoelectric element was epoxy bonded to pipe 34 to provide driver transducer 38. Various types of driver elements could be used such as electrodynamic transducers. However, the mounted mass and the location of the transducers affect both the mode of the vibration and the pressure sensitivity. Pressure sensitivity as used herein is the change in frequency with respect to change in pressure. More massive transducers tend to load the pipe wall to diminish sensitivity.

Figures 9, 10:
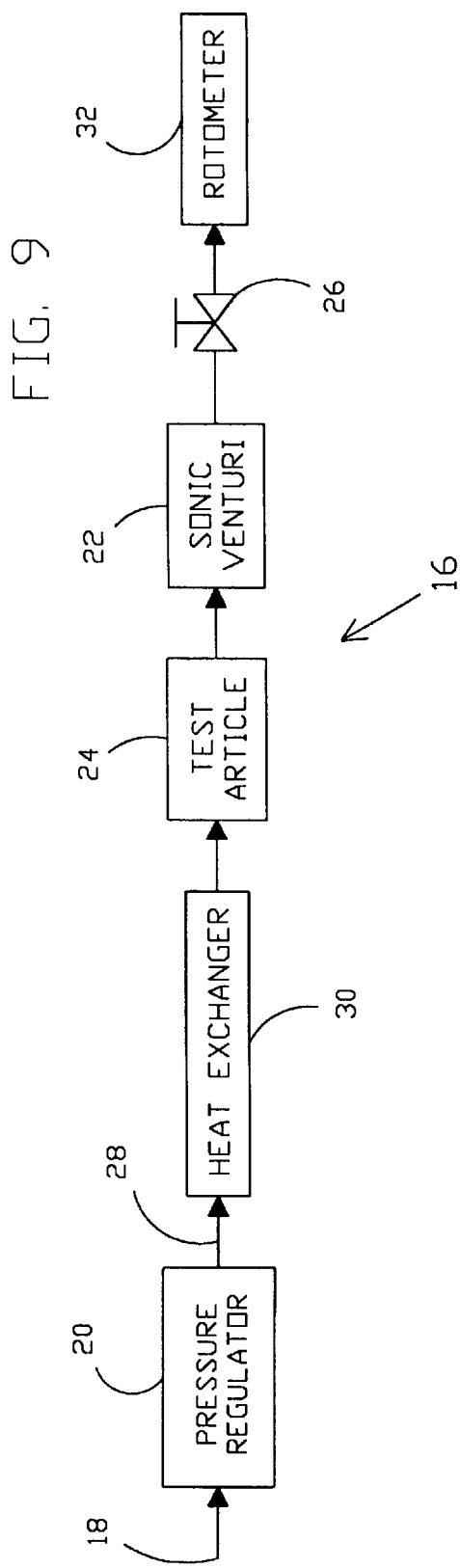
FIG. 9 is a schematic of a pressurized system that is controllable for testing embodiments of the present invention.
FIG. 10 is a chart showing pressure sensitivity of different implementations of the present invention.

For receiver transducer 42, a flat two inch round piezoelectric element identical to that of driver 38 was selected and mounted in the same way. Receiver transducer 42 is mounted parallel and diametrically opposite to driver 38. The placement of the driver and receiver elements determines the modes of vibration excited in the pipe or other vessel. The sensitivity of the lowest order nodes, i.e., fewest driving points around the circumference (in this embodiment one driver and one receiver) have been shown to have a pressure sensitivity almost as great as higher order modes. In FIG. 10, finite element analysis models show that the higher order modes of hoop vibration contribute relatively little to sensitivity beyond the n=3 mode. The lower the mode, the simpler the vibration pattern on the walls of the container, so the implementation and interpretation considerations favor the lower order mode. Also, normal externally coupled pipe vibrations tend to excite rather complex modes of vibration and many modes, so one would expect the higher order modes to mix badly with modes of unintended vibrations. On the other hand, a selected higher mode of driven vibration might be an appropriate suppression of the effects of a large unintended vibration at a known lower frequency. Therefore, the selection of the mode of operation, and hence the number and placement of transducers, may be influenced by the application environment.

Figure 4:
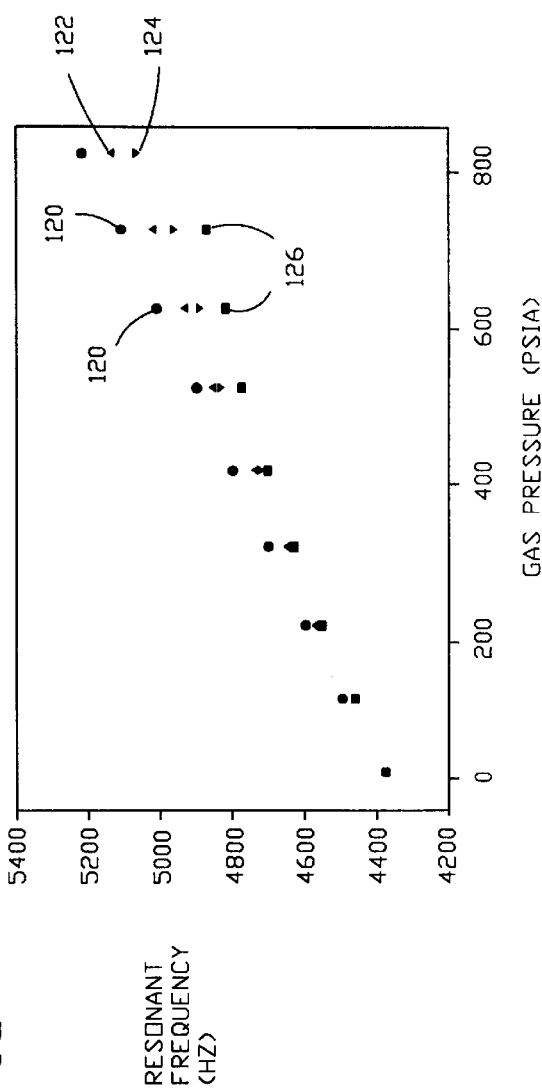
FIG. 4 is a graph of resonant frequency versus gas pressure for several different types of gas as measured with a hoop mode sensor.

For hoop mode vibration, a pinching force is applied by driver transducer 38. The slight deflection velocity of the fluid stream induced by the pinching vibration from driver transducer 38 causes a slight advance or retard to the deflection that is detected by receiver transducer 42 at the diametrically opposite side. As shown in FIG. 4 for several different gases as discussed hereinafter, the resonant frequency of the flow-perturbed vibration is proportional to the pressure of the enclosed fluid stream.

For this embodiment, voltage controlled oscillator 44 energizes driving element 38 with a driving signal. A receiver signal from receiver transducer 42 is connected by receiver line 46 to phase-locked frequency controller 48. The driving signal at 50 and receiver signal from line 46 are compared in phase-locked frequency controller 48 to produce an error signal 52. Error signal 52 varies the frequency output of the driving signal from voltage controlled oscillator 44 until the driving signal and receiver signal are in phase. Both signals are in phase when the resonant frequency of the selected vibrational mode of pipe segment 34 is excited. As the pressure varies, controller 48 will cause voltage-controlled oscillator 44 to vary the frequency to track the selected vibrational mode resonance frequency of pipe segment 34. Frequency detector 54 detects the frequency. Temperature sensor 59 is an external temperature sensor that measures pipe temperature and may be used as a close approximation for gas temperature where accuracy decreases as the gas becomes less dense. The temperature sensor may be used to adjust the pressure reading for temperature effects as discussed hereinafter.

The control system of FIG. 1 may be implemented in different ways such as with laboratory equipment or with off the shelf discrete components. For instance using off the shelf components, a MAX038 integrated circuit component includes a voltage-controlled oscillator and a phase error detector so that it can be connected as a phase-locked loop control. Frequency detector 54 was implemented using an AD850 frequency to voltage converter integrated circuit to provide an output voltage proportional to pressure. In the laboratory component implementation of hoop mode sensor 10, a frequency counter was used with frequency to a resolution of 1 milliHertz having a calibrated accuracy within 0.05 percent of reading. Other lab components were used to implement the remaining elements of the system. The control system of FIG. 1 was good for static pressure measurements, but lost accuracy for increasing flow rates up to about 10 lbm/min. For flow rates over about 10 lbm/minute, multiple modes of vibration were produced that cause a loss of phase-lock control with the control system of FIG. 1. The laboratory implementation worked better than the integrated circuit implementation because the laboratory oscillator has about 500 times less phase noise error. A control circuit with ultra-low phase noise error is disclosed in FIG. 2 as discussed hereinafter.

Other means for implementing the pressure measurement hoop mode non-intrusive device of the present invention include applying a signal and monitoring the signal for oscillation as indicated by an amplitude maximum. The maximum might be monitored on an oscilloscope. Therefore, a flow pipe segment, such as segment 34, may be adapted to the plumbing of a pressurized system and monitored in various ways.

In a hoop mode mass flow meter, mass flow rate may be measured by comparing the phase of two sensors such as receiver sensor 42 and receiver sensor 56 in mass flow detector 58 which operates in a manner known to those of skill in the art to provide the mass flow rate. Thus, the present invention provides an improvement for mass flow meters in that it is operable for non-intrusively measuring both mass flow rate and pressure simultaneously. However, for larger flow rates it is desirable to use a control system with ultra low phase noise error and tunable bandpass detection such as control system 12 indicated in FIG. 2.

For accurate measurement with significant flow, it is necessary to provide a driver circuit that exhibits ultra-low phase noise error. One way to implement a very low phase noise error is as indicated in FIG. 2. Voltage controlled oscillator 60 is selected for low phase noise error. Clock output 61 of voltage controlled oscillator 60 preferably is divided to a submultiple frequency by digital divider chain 62 and then applied to tunable digital bandpass filter 64. The design of tunable digital filters that were considered was based on the center frequency of the filter bandpass being a fixed fraction, such as divide by 100, below the clock frequency of the filter. Therefore, divide-by-N element 62, serves the purpose of providing a center frequency signal for the bandpass filter as the desired ratio of VCO 60 output. An associated benefit of this approach is a reduction in phase noise error. While a multiplier approach could have been used whereby a lower frequency VCO output would be used with a multiplier, a multiplier might aggravate phase noise error. The trade off for the divider approach is the need for a wider tuning range for the VCO, but a wider tuning range for the VCO is often accompanied by higher phase noise error.

Tunable digital bandpass filter 64 provides a bandpass filter to shape the driving waveform generated by divide by N element 62. The center frequency of tunable digital filters 64 and 74 is controlled by the clock output 61 to tunable digital filters 64 and 72 fed by line 65 from VCO 60. The clock must be a fixed multiple N of the bandpass center frequency. Control of the frequency of VCO 60 is accomplished by phase-locking VCO 60 to a multiple N of the resonant frequency of pipe 68 as detected by receiver 70. An error signal 82 is produced by phase detector 76 generated by the comparison of reference signal at 78 and signal 80 from receiver 70. Thus, the latter signal closes the phase-locked loop. The clock frequency 65 to filters 64 and 72 must always be at a fixed multiple N of the driver signal from divide by N element 62. Thus, the VCO runs at clock frequency and the driver signal to driver transducer 66, as generated by divide by N element 62 runs at a fixed fraction 1/N of the clock frequency. The phase-lock loop controls the driver/receiver frequency even though the VCO has a higher clock frequency.

The bandpass of tunable digital filters 64 and 72 is chosen with the following tradeoff. The narrower the pass band, the more noise will be rejected by the filter. On the other hand, the narrow bandpass slows the response of the feedback loop, so noise rejection by the phase-locked loop is reduced and control response is reduced. Thus, the filter is not necessarily a narrow bandpass and may be optimized for the system in which it will operate based on the above discussed tradeoffs.

Phase shifter 74 is used to set the relative phase of the receiver signal to cause the error signal to pass through zero when driver/receiver frequency is precisely tuned to the mechanical resonance frequency of the vibrated pipe section. Thus, the phase-locked loop tracks the resonance frequency. Thus, phase shifter 74 should be adjustable for this preset value, but this value should not change with time. Typically, there is a phase difference between the driver and the receiver caused by the resonance response of the vibrated pipe 68. This should be accommodated to set the phase of the received signal from receiver 70 with respect to reference signal 78 so that phase detector 76 generates the proper error signal close to resonant frequency.

FIG. 3 shows bending mode pressure sensor embodiment 14. A bent pipe segment 100 is made to vibrate rotationally with respect to straight segment 102 by vibration driver 104. Many different types of bending mode mass sensors are available with various sensor locations and types of bends including moderate bends, corkscrew bends, and the like. In those sensors, mass flow is determined by the phase difference between two receiver sensors such as sensor 106 and 108 typically using a phase detector mass flow indicator such as indicated at 109. For this embodiment, the bent pipe segment is made to resonant as per vibration driver 110. Resonant frequency is detected by frequency detector 112 and is converted to pressure as indicated at 114. Thus, bending mode pressure sensor 14 operates to provide fluid pressure and may also be used to provide a mass flow rate. As well, most mass flow meters also compute fluid density so that, if desired, pressure, mass flow rate, and density are all available. To implement this mode, several commercially available mass flow meters were used with a sensor signal taken, such as signal 111, for detection of the resonant frequency as indicated in FIG. 3.

FIG. 4 discloses the results of pressure versus frequency with the hoop mode pressure sensor implementation for the four different test gases where marks 120 are for helium, marks 122 represent nitrogen, marks 124 represent argon, and marks 126 represent readings for carbon dioxide. For the hoop mode implementation, the variation in resonant frequency was about 1000 Hz over the tested pressure range. For the hoop mode implementation, the responses for all the gases exhibit a positive pressure sensitivity, i.e., the slope of all the curves is positive. The trend in sensitivity for these gases decreased roughly as the density of the gases, but not strictly proportional to their molecular weight. For helium as indicated by marks 120, the slope is highly linear and the pressure sensitivity is 1.045 Hz/psi. For nitrogen, the slope is also linear and is somewhat lower at 0.9128 Hz/psi. For argon, the slope is linear up to about 500 psi with a slope of 0.8711 Hz/psi. For carbon dioxide, the slope is linear up to about 300 psi with a slope of 0.827 Hz/psi. It will be noted that at the tested temperature that carbon dioxide approaches a vapor-liquid phase transition near the top of this pressure range that may explain some of the non-linearity of the reading.

Figure 5:
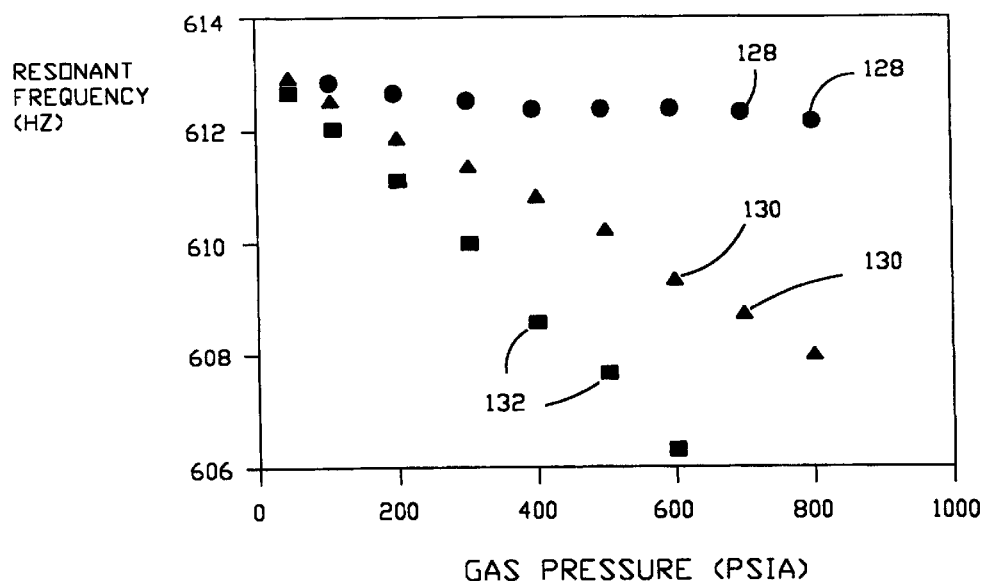
FIG. 5 is a graph of resonant frequency versus gas pressure for several different types of gas as measured with a bending mode sensor.

FIG. 5 discloses results of pressure versus frequency for a bending mode pressure sensor implementation as described in FIG. 3 for three different gases. Unlike the hoop mode meter, the bending mode meter exhibits negative pressure sensitivity, i.e., the slope of the curves for each gas is negative. Again, the trend in pressure sensitivity for the gases decreased roughly as the density of the gases, but not strictly proportional to their molecular weight. The plot of helium pressure versus frequency is represented by marks 128. For nitrogen, the plot is shown by marks 130. For carbon dioxide, the plot is shown by marks 132. The scale shows a frequency range of about 8 Hz over the pressure range so that the magnitude of sensitivity for the bending mode implementation is lower than that of the hoop mode. In FIG. 10, the sensitivity in Hz/psi for the gas nitrogen is compared for a different but similar bending mode device and the same hoop mode device discussed above. It will be noted that the sensitivity of the bending mode is approximately the same magnitude as that indicated for the bending mode device whose results are shown in FIG. 5, but the resonant frequency is lower. FIG. 10 also shows the modeled resonant frequencies for higher order vibrational modes for the hoop mode implementation. As stated above, the sensitivity for higher order vibrational modes is not appreciably greater than that of the simpler to implement n=2 hoop mode implementation shown in FIG. 1 and FIG. 2.

Figure 7:
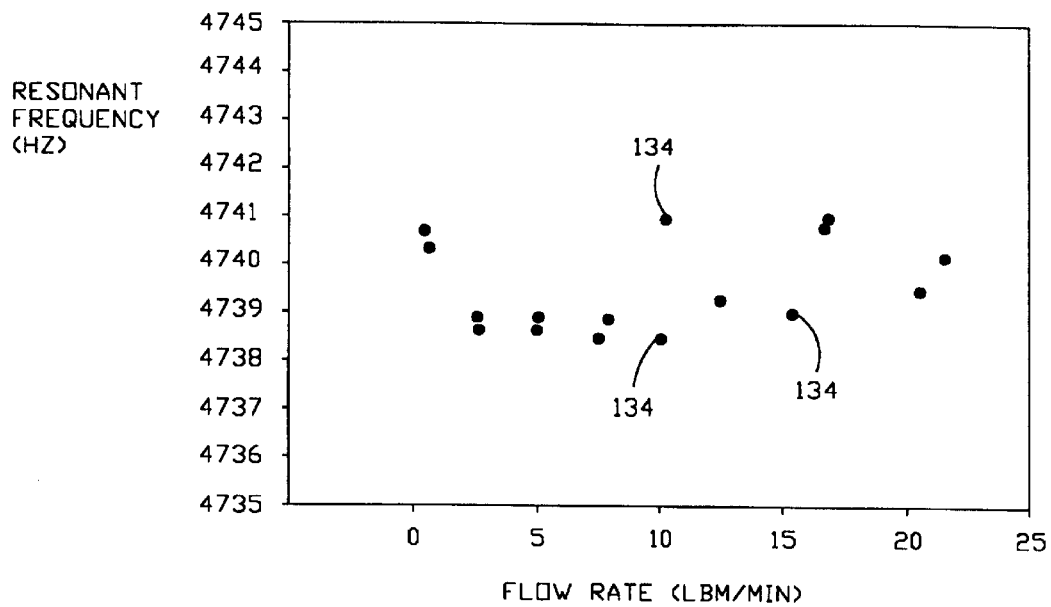
FIG. 7 is a graph of resonant frequency variation in a hoop mode sensor with respect to flow rate.
Figure 8:
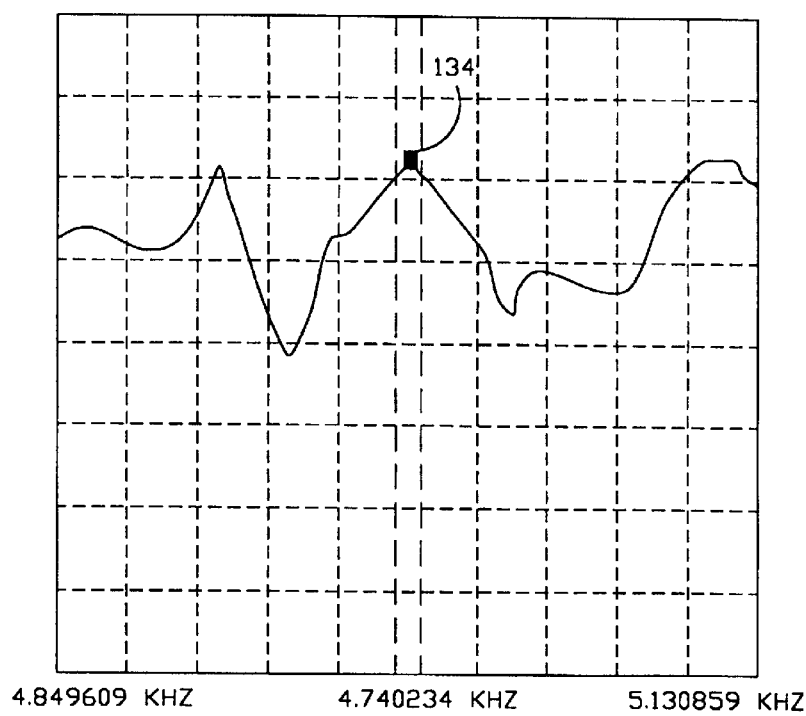
FIG. 8 is a graph showing a peak detector for use in measuring resonant frequency for a selected narrow bandwidth of frequencies of an averaged signal.

FIG. 7 and FIG. 8 relate to accuracy of pressure readings during even high flow rates with a hoop mode implementation using noise reduction techniques. The scatter in the upper and lower points 134 of the graph of FIG. 7 is less than about three Hertz, which is less than about 0.1% error of full scale reading for the hoop mode implementation. The flow rate was up to about 22 lbm/min. The data includes run sequences with both increasing flow rates and decreasing flow rates. Three sets of measurements are included. FIG. 8 is representative of techniques used for measurements shown in FIG. 7 that led to the development of low noise control 12 of FIG. 2. A laboratory detection instrument was set to detect a bandwidth of 488 milliHertz at the resonant frequency. The signal was averaged for about 20 scans and automatic peak detection as indicated at 136. Due to mode mixing and turbulent flow, noise control and vibration mode isolation and stability are important for pressure measurement during gas flow.

Flow measurements with the bending mode implementation resulted in changes of less than 0.5 Hz over the flow range from 0.001 to 10 kg/min (22 lbm/min). The small change seemed to track very closely the small drift in temperature.

Rather extensive testing of various features of the above embodiments shown in FIG. 1–FIG. 3 was effected through test pressurized system 16 of FIG. 9. In test pressurized system 16, source 18 includes several different types of gases including nitrogen, helium, argon, and carbon dioxide. Most of the higher flow rate measurements were made with nitrogen as this gas was available with system 16 at rates up to about 10 kg/min (22 pounds/min) and at pressures up to about 8 MPa (1160 psi). The maximum pressure was available for the other gases but at lower flow rates. Pressure regulator 20 and sonic venturi 22 were used to control gas flow rates. The size of sonic venturi 22 selected the flow range, and the flow rate within this range was typically adjustable over a thirty-to-one, or greater, range determined primarily by the pressure drop through system flow components as controlled by pressure regulator 20. The embodiments 10, 12, and 14, of the invention and other embodiments were inserted as test articles as designated at item 24. Throttling valve 26 downstream from sonic venturi 22 provided separate manual adjustment of the pressure in the tested embodiments of the invention designated as test articles 24 and the flow rate therethrough. The temperature of the flowing gas stream was adjusted using thermostatically controlled preheating tapes (not shown) wound onto feed pipe 28 of heat exchanger 30 plus temperature control of the heat transfer liquid in heat exchanger 30. The throttling process through pressure regulator 20 cooled source gases 18 so the preheating tapes greatly reduced the temperature variations of the inlet gas to heat exchanger 30. The high end temperature of heat exchanger 30 was about 40° C. and the low end about 5° C. The mass flow rate through the system was measurable by rotometer 32 for comparison with measurements of mass flow rate from various tested devices that are embodiments of the present invention whereby both pressure and mass flow rate are measurable simultaneously, if desired.

Figure 6:
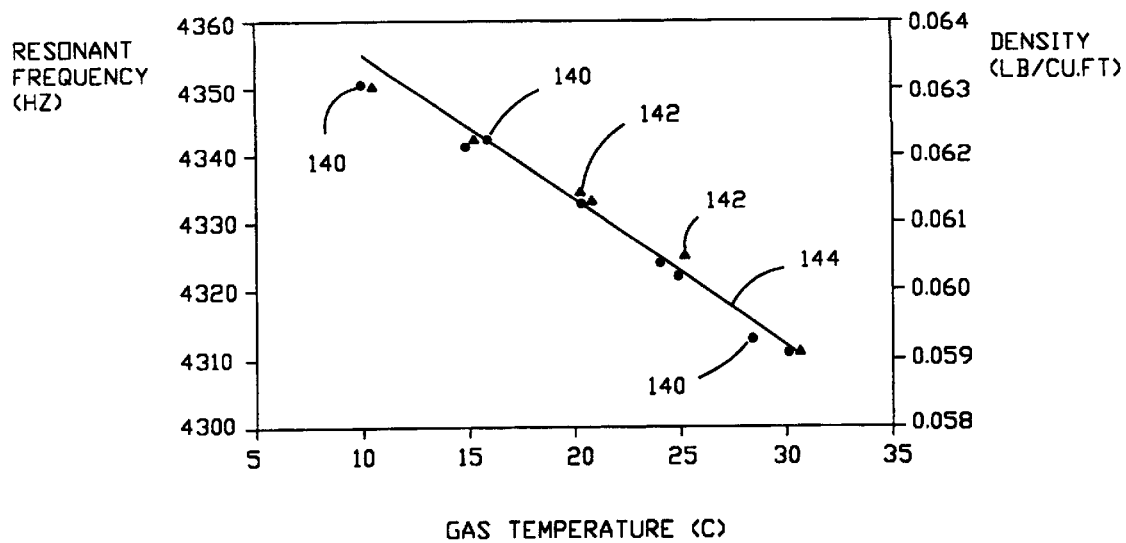
FIG. 6 is a graph of resonant frequency, density, and temperature with a calculated plot of density for two different gases.

Temperature correction for the pressure readings is generally required and FIG. 6 shows variations in frequencies for two gases caused by varying temperatures for the hoop mode implementation of the invention. Circles 140 represent frequency/temperature readings taken in Helium. Triangles 142 represent frequency/temperature readings taken in nitrogen. The responses for both gases exhibited very similar slopes. It was anticipated that much of the temperature dependence would relate to temperature dependence of density to gas temperature. Therefore, solid line 144 was calculated and plotted onto FIG. 6. Although most of the temperature dependence was clearly shown to arise from the temperature dependence of the gas density, the measurements seemed to exhibit a slight concave-downward trend whereas the calculated density over this temperature range had a slight concave-upward trend. Gas temperature during flow using an external temperature sensor as indicated at 59 in FIG. 1 was found to be a reasonable approximation of gas flow temperature as measured with a temperature sensor in the gas stream. The two sensors were found to equilibrate at about 0.1° K. within about twenty seconds at high flow rates, but at low flow rates that time was extended to about three minutes. The equilibrium temperature was also found to depend somewhat on the difference between the ambient temperature and that of the gas.

From the above, it has been conclusively demonstrated that pressure measurements are practical using a non-intrusive sensor that also can be used to measure other attributes such as mass flow rate, fluid density, and temperature. Most manufacturers of commercial Coriolis flow meters have already implemented density measurement simultaneous with flow measurements. Although it is beyond the scope of this application, additional measurement of viscosity appears to be a likelihood using the same sensors. Temperature measurements at least for a thin wall pipe were found to be a reasonable approximation of that of enclosed gas to permit temperature corrections. Thus, it is possible that many or most of the physical properties of an enclosed gas may be inferred from a single non-intrusive transducer. It is known that using the pressure, density, and temperature of an enclosed fluid, the state equation can be used to identify the fluid. As well, from the charts disclosed herein, nitrogen, helium, argon, and carbon dioxide could be easily distinguished. Within the accuracy of the experiments, the possibility to distinguish mixture proportions is implied. Similar experiments were not verified for liquids, however, the principal would be expected to be the same.

While the preferred embodiment pressure and multi-measurement devices and methods are disclosed in accord with the law requiring disclosure of the presently preferred embodiment of the invention, other embodiments of the disclosed concepts may also be used. Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A non-intrusive apparatus for connection to a pressurized system for monitoring pressure therein, comprising:

a metal pipe section connectable to said pressurized system;

a vibrating element secured to said metal pipe section for vibrating said metal pipe section;

at least one sensor element secured to said pipe section for detecting a receiver signal related to a vibration frequency of said pipe;

a voltage controlled oscillator for producing a reference signal and for driving said vibrating element with a driver signal; and a frequency controller operable for comparing said receiver signal and said reference signal to produce an error signal, said error signal being used for voltage control of said voltage controlled oscillator to maintain said metal pipe section at a resonant frequency.

2. The non-intrusive apparatus of claim 1, wherein:

said reference signal and said driver signal are the same signal.

3. The non-intrusive apparatus of claim 1, further comprising:

a tunable digital bandpass filter having a center frequency that is tunable to track said resonant frequency for filtering said receiver signal.

4. The non-intrusive apparatus of claim 3, wherein:

said tunable digital bandpass filter further is automatically tunable responsively with respect to said reference signal.

5. The non-intrusive apparatus of claim 4, further comprising:

a second tunable digital bandpass filter.

6. The non-intrusive apparatus of claim 1, further comprising:

a frequency detector in electrical communication with said receiver signal to measure said resonant frequency.

7. The non-intrusive apparatus of claim 1, further comprising:

a digital frequency divider for producing a driver signal that is a submultiple of said reference signal.

8. The non-intrusive apparatus of claim 1, wherein:

said metal pipe section is straight without bends.

9. The non-intrusive apparatus of claim 1, further comprising:

a second vibrational sensor for said pipe for use in determining mass flow rate through said metal pipe section.

10. A method for measuring a fluid pressure of a fluid within a pressurized system, comprising:

attaching a tubular pipe to said pressurized system, said pipe being provided with an inlet and an outlet, said pipe being provided with a smooth interior surface such that any fluid flow through said tubular pipe between said inlet and outlet is unrestricted;

applying a vibrating force to at least one portion of said tubular pipe for vibration at a resonant frequency;

detecting said resonant frequency of said tubular pipe; and determining said fluid pressure of said fluid within said pressurized system from said resonant frequency;

providing a control system with an external oscillator for said application of a vibrating force to at least one portion of tubular pipe at said resonant frequency, said control system being operable for automatically tracking said resonant frequency with said external oscillator as said resonant frequency varies due to any change in said fluid pressure; and providing said control system with a phase-lock loop system for said automatic tracking of said external oscillator to said resonant frequency.

11. The method of claim 10, further comprising:
providing that said pipe includes a bend between said inlet and said outlet.

12. The method of claim 10, further comprising:
providing that said pipe is straight between said inlet and said outlet.

13. The method of claim 10, further comprising:
providing said control system with a drive circuit having very low phase noise error for said application of said vibration force.

14. The method of claim 13, further comprising:
implementing said control system with integrated circuit components.

15. The method of claim 10, further comprising:
using a phase sensor attached to said tubular pipe for determining mass flow through said tubular pipe.

16. The method of claim 10, further comprising:
determining density of the fluid from said resonant frequency.

17. A method for non-intrusively making multiple measurements in a pressurized system, comprising:

applying a vibrational force externally to a section of pipe in said pressurized system for vibrating said section of pipe at a resonant frequency;

attaching at least two vibrational sensors to said section of pipe;

determining said resonant frequency of said section of pipe;

measuring a phase difference signal between said at least two vibrational sensors;

determining a mass flow rate through said section of pipe from said phase difference; and determining a pressure within said section of pipe from said resonant frequency.

18. The method of claim 17, further comprising:
determining a gas density.

19. The method of 17, further comprising:
providing that said section of pipe is straight.

20. The method of claim 17, further comprising:
providing that said section of pipe is bent.

21. The method of claim 17, further comprising:
providing a controllable bandpass filter with a center frequency that tracks said resonant frequency.

22. The method of claim 17, further comprising:
providing a signal with low phase noise error for applying said vibrational force.

23. The method of claim 17, wherein:
said steps of determining mass flow rate and determining pressure are performed simultaneously.

24. A method for measuring pressure while a gas is flowing, comprising:

providing a tubular pipe through which said gas is flowing;

applying a vibrational force to said tubular pipe;

receiving a vibrational signal from said tubular pipe related to said vibrational force; and determining a pressure within said pipe from said vibrational signal while said gas is flowing through said tubular pipe.

25. The method of claim 24, further comprising:
applying said vibrational force to said tubular pipe continuously.

26. The method of claim 25, further comprising:
said vibrational force being sinusoidal.

27. Th method of claim 25, further comprising:
controlling said vibrational force to track resonance of said tubular pipe.

28. The method of claim 25, further comprising:
providing low phase error in said vibrational force.

29. The method of claim 28, further comprising:
determining a mass flow rate of said gas through said tubular pipe.

30. A non-intrusive apparatus for measuring pressure in a system, comprising:

a sensor section;

a vibration driver element secured to said sensor section;

a receiver element secured to said sensor section;

a voltage controlled oscillator for maintaining vibration of said sensor section at a resonance frequency;

a first tunable bandpass filter that is tunable responsively to said voltage controlled oscillator; and a detector to convert resonance frequency to a pressure.

31. The non-intrusive apparatus of claim 30, further comprising:

a second tunable bandpass filter that is tunable responsively to said voltage controlled oscillator.

32. The non-intrusive apparatus of claim 30, further comprising:

a digital divider chain for producing an integral submultiple of a signal from said voltage controlled oscillator to produce a drive signal for said vibration element.

33. The system of claim 30, wherein:
fluid is free to flow through said sensor section.

34. The system of claim 30, further comprising:
said sensor section is a bent tubular.

35. The system of claim 30, further comprising:
said sensor section is a straight tubular.

36. The system of claim 30, further comprising:
a second receiver to determine a mass flow rate through said sensor section.

37. The system of claim 36, wherein:
said mass flow rate and said pressure are simultaneously measurable.

38. A non-intrusive method for measuring a pressure in a system, comprising:

providing a pipe section for said system;

securing a vibrational drive element to said pipe section;

securing a vibrational sensing element to said pipe section to produce a sensing signal;

driving said drive element at a resonant frequency;

monitoring a selectable frequency bandwidth of said sensing signal around said resonant frequency to produce a reduced noise sensing signal; and determining said pressure from said resonant frequency.

39. The method of claim 38, further comprising:

averaging said reduced noise sensing signal over a plurality of cycles of said sensing signal to produce an averaged sensing signal.

40. The method of claim 39, further comprising:

peak-detecting said averaged sensing signal.

41. The method of claim 38, further comprising:

providing that said pipe section is connectable to said system such that gas is received within said pipe section.

42. The method of claim 38, further comprising:

providing said pipe section is straight.

43. The method of claim 38, further comprising:

providing said pipe section is bent.

\* \* \* \* \*